March 16, 1926.
A. E. LIDELL
1,576,918
WRENCH
Original Filed April 17, 1924
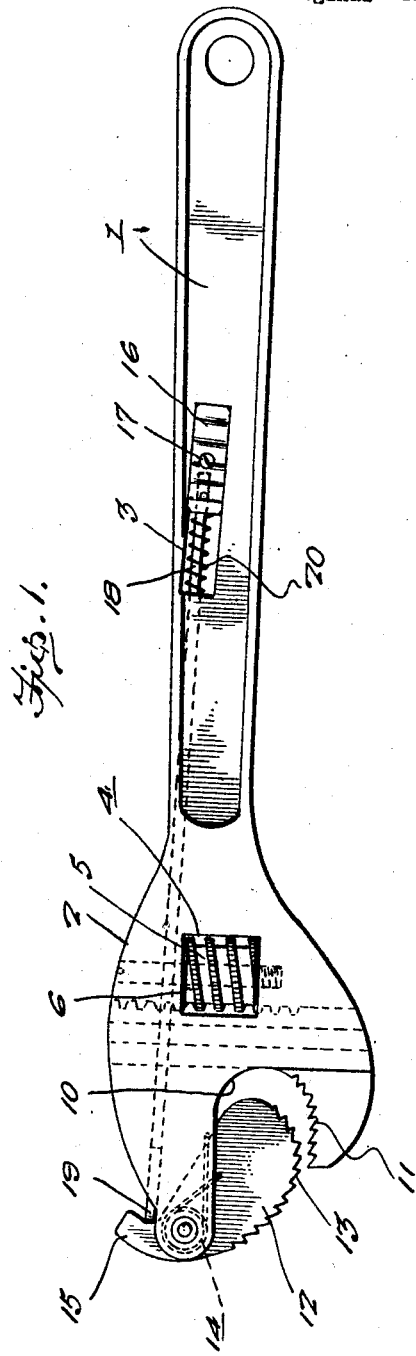
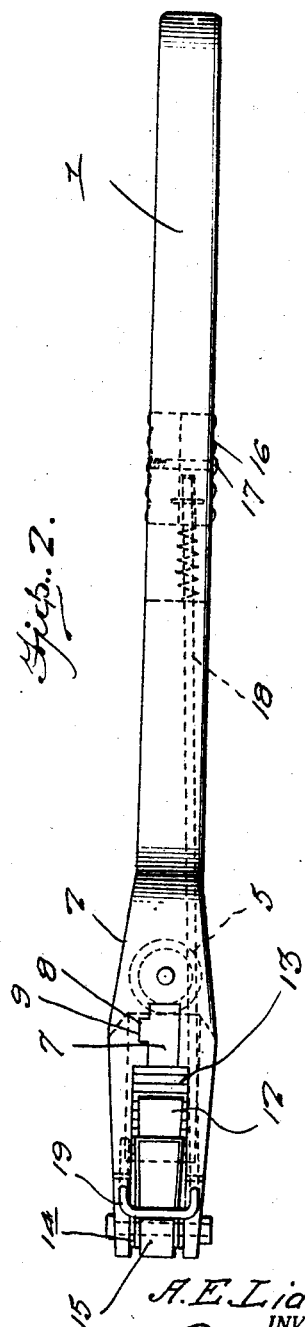
A. E. Lidell
INVENTOR.
BY
ATTORNEYS.

Patented Mar. 16, 1926.

1,576,918

UNITED STATES PATENT OFFICE.

ANDREW EMANUEL LIDELL, OF FARMINGTON, MICHIGAN.

WRENCH.

Application filed April 17, 1924, Serial No. 707,173. Renewed July 22, 1925.

*To all whom it may concern:*

Be it known that I, ANDREW EMANUEL LIDELL, a citizen of the United States, residing at Farmington, in the county of Oakland and State of Michigan, have invented certain new and useful Improvements in a Wrench, of which the following is a specification.

This invention relates to wrenches and it consists in the novel features hereinafter described and claimed.

An object of the invention is to provide a wrench structure especially adapted to be used upon pipe and rod work and having its parts and features so assembled and arranged that they may securely grip and hold pipes or rod sections which differ slightly in diameter and without readjusting or setting the gripping or clamping elements and features of the wrench.

A further object of the invention is to provide a wrench structure having adjustable parts, the arrangement being such that the adjustment thereof may be effected readily and with the use of one hand only. Also the wrench may be removed from a section of rod or pipe by the use of one hand only.

A further object of the invention is to provide a wrench structure which will retain its grip upon a pipe or rod when the wrench has been released from the grasp of the operator so that one operator may conduct the work of two operators by using two of the wrenches.

In the accompanying drawing.

Figure 1 is a side elevational view of the wrench, and

Fig. 2 is an edge elevational view of the same.

The body of the wrench includes a handle shank 1 provided with a substantially ovate head portion 2. The shank 1 is provided with a slot 3 which is disposed generally, longitudinally thereof, and with its long dimension inclined at a slight angle to the length of the shank 1. The head portion 2 is provided with an opening 4 in which is journaled a cylindrical nut 5 having a coarse peripheral thread 6. A rack bar 7 is slidably mounted in the head portion 2 and the thread 6 meshes with the teeth of the rack bar. The rack-bar 7 is provided at its side with a shoulder 8 which is snugly received in a recess 9 provided in the head portion 2 and which restrains the bar 7 against transverse movement in the head portion 2. The head portion 2 is provided with a recess 10 which enters in from the outer end of the said head portion. The inner end of the recess 10 is curved and the outer edge of the wall of the recess 10 is provided with teeth 11. A cam member 12 is pivoted at the outer end of the head portion 2 and is provided along its cam edge with teeth 13 which are disposed opposite the teeth 11 of the recess 10. A spring 14 is coiled about the pivot of the cam member 12 and one end of the spring engages the edge of the recess 10 and the other end of the spring engages the edge of the cam member whereby the teeth 13 are normally held toward the teeth 11. The cam member 12 is provided with an angularly disposed lug 15 which is positioned exteriorly of the outer edge of the head portion 2. Plates 16 are slidably mounted at the opposite sides of the shank 1 and the said plates are connected together by a screw 17 which passes through the slot 3. One end of a rod 18 is pivotally connected with the plates 16 and the said rod 18 passes through the outer portion of the shank 1 and traverses the length of the head 2 and projects beyond the outer end thereof and is provided with a return bend 19 also guided in the head portion 2 and which is disposed against the inner edge of the lug 15 as best shown in Figure 1 of the drawing.

A coil spring 20 is located in the slot 3 and surrounds the rod 18. One end of the coil spring bears against the end wall of the recess 3 and the other end of the said spring bears against the plates 16. The spring 20 is under tension with a tendency to hold the plates 16 disposed away from the head portion 2 and to retain the return bend 19 of the rod 18 against the end edge of the head portion 2.

In the use, the pipe or rod is inserted in the recess 10. The teeth 11 are carried upon that jaw which is mounted upon the bar 7 and by turning the nut 5, ample clearance space may be provided within the recess 10 to receive the said pipe or rod. At the time that the pipe or rod is inserted in the recess, the cam member 12 is swung away from the set of teeth 11 and the teeth 13 engage the periphery of the pipe or rod. To provide additional clearance space, an operator may slide the plate 16 along the shank 1 whereby the rod 18 is moved longitudinally and the return bend portion 19 of the said rod encounters the edge of the lug 16 and swings the cam member 12 whereby the teeth 13 may be completely withdrawn beyond the inner edge of the recess 10 and to a position within the head portion 2.

When pressure is released from the plates 16, the tension of the spring comes into play and the rod 18 is withdrawn from the lug 15 and the spring 14 swings the cam member 12 so that the teeth 13 thereof engage the side of the pipe or rod. It is apparent that when the wrench is applied to the pipe or rod as stated, that the grip of the operator may be released from the handle shank, and the said wrench will remain in a clamped position upon the pipe or rod.

Having described the invention, what is claimed is:

A wrench comprising a body including a shank and a head, a jaw slidably mounted in said head, a cam member pivotally secured in said head for swinging movement toward and away from the jaw, spring means engaging with the head and cam member to normally urge the latter toward the jaw, and a rod mounted for longitudinal movement in the head and shank and engageable with the cam member to swing the same away from the jaw against the resistance of the spring.

In testimony whereof I affix my signature.

ANDREW EMANUEL LIDELL.